United States Patent [19]
Pabla et al.

[11] Patent Number: 5,585,784
[45] Date of Patent: Dec. 17, 1996

[54] CIRCUIT FOR STOP SIGNAL OVERRIDE OF HAZARD WARNING SIGNAL AT REAR LAMPS OF A VEHICLE

[75] Inventors: Parmjit S. Pabla, Fort Wayne; Merrill D. Miller, Huntington, both of Ind.

[73] Assignee: Navistar International Transportion Corp., Chicago, Ill.

[21] Appl. No.: 602,191

[22] Filed: Feb. 16, 1996

[51] Int. Cl.$^6$ ............................................. B60Q 1/34
[52] U.S. Cl. .................... 340/475; 340/431; 340/468; 340/479; 307/10.8; 315/77
[58] Field of Search ...................... 340/475, 431, 340/468, 479; 307/10.8; 315/77

[56] References Cited

U.S. PATENT DOCUMENTS

| | | | |
|---|---|---|---|
| 3,613,076 | 10/1971 | Ballou | 340/475 |
| 3,659,267 | 4/1972 | Holt | 340/475 |
| 3,883,845 | 5/1975 | DeVita | 340/431 |
| 4,006,453 | 2/1977 | Bryant | 340/431 |
| 4,812,808 | 3/1989 | Ulrich | 340/475 |

OTHER PUBLICATIONS

"Electrical Circuit Diagrams–2000,4000,8000 Truck and Tractor" #CTS–51225 (1–95) Navistar International Transportation Corp., p. 31, Jan., 1995.

*Primary Examiner*—Jeffery Hofsass
*Assistant Examiner*—John Tweel
*Attorney, Agent, or Firm*—Dennis K. Sullivan

[57] ABSTRACT

An automotive vehicle electrical circuit that, when the hazard warning switch is in the on position, provides for the front lamps on both sides of the vehicle to continue to flash on and off when the stop lamp switch is actuated to continuously illuminate the rear lamps on both sides of the vehicle. The invention enables a pre-existing lamp control circuit to be cost-efficiently adapted to this form of control with only relatively minor modifications, namely the addition of two diodes and a minor change to the pre-existing turn signal switch. The invention may also be used to advantage in the production of new vehicles.

18 Claims, 1 Drawing Sheet

5,585,784

CIRCUIT FOR STOP SIGNAL OVERRIDE OF HAZARD WARNING SIGNAL AT REAR LAMPS OF A VEHICLE

FIELD OF THE INVENTION

This invention relates generally to electrical circuits of automotive vehicles, and is more specifically directed to a circuit for causing a stop signal to override a hazard warning signal at the rear lamps of a vehicle.

BACKGROUND AND SUMMARY OF THE INVENTION

Automotive vehicles comprise left front, right front, left rear, and right rear lamps for giving certain signals. The signals given by these lamps are controlled by a turn signal switch, a hazard warning switch, and a stop lamp switch.

A known lamp control circuit for controlling the operation of these lamps has a construction that functions in the following manner: A) when the stop lamp switch is actuated while the hazard warning and turn signal switches are off, the right and left rear lamps continuously illuminate to give a stop signal at the rear of the vehicle; B) if the turn signal switch is actuated to signal a turn while the stop lamp switch is not actuated and the hazard warning switch is off, the front and rear lamps on the side of the vehicle that is toward the direction of the intended turn flash on and off while the front and rear lamps on the opposite side of the vehicle remain off; C) if the stop lamp switch is actuated concurrent with operation of the turn signal switch to signal either a right or a left turn while the hazard warning switch is off, the front and rear lamps on the side of the vehicle that is toward the direction of the intended turn flash on and off while the rear lamp on the opposite side of the vehicle remains continuously on; and D) if the hazard warning switch is turned on, front and rear lamps on both sides of the vehicle flash on and off irrespective of the position of the turn signal switch provided that the stop lamp switch is not actuated, but if the stop lamp switch is actuated, it will override the hazard warning switch to cause front and rear lamps on both sides of the vehicle to continuously illuminate.

In a specific embodiment to be hereinafter described, the present invention will be seen to relate to a new and unique circuit that, when the hazard warning switch is in the on position, provides for the front lamps on both sides of the vehicle to continue to flash on and off when the stop lamp switch is actuated to continuously illuminate the rear lamps on both sides of the vehicle. If the vehicle has multiple right rear lamps and multiple left rear lamps, actuation of the stop lamp switch while the hazard warning switch is on may cause at least one rear lamp on each side to continuously illuminate while at least one other rear lamp on each side flashes on and off.

An important advantage of the invention is the ability to adapt a pre-existing lamp control circuit, as described above, to this different form of control with only relatively minor modifications, namely the addition of two diodes and a minor change to the pre-existing turn signal switch. Such a capability makes conversion of a pre-existing circuit relatively less costly than other alternatives for accomplishing the same result. The invention may however also be used to advantage in the production of new vehicles.

The foregoing, along with further features, advantages, and benefits of the invention, will appear in and from the following detailed description of a presently preferred embodiment representing the best mode contemplated at this time for carrying out the invention.

DESCRIPTION OF THE PREFERRED EMBODIMENT

Figure 1:
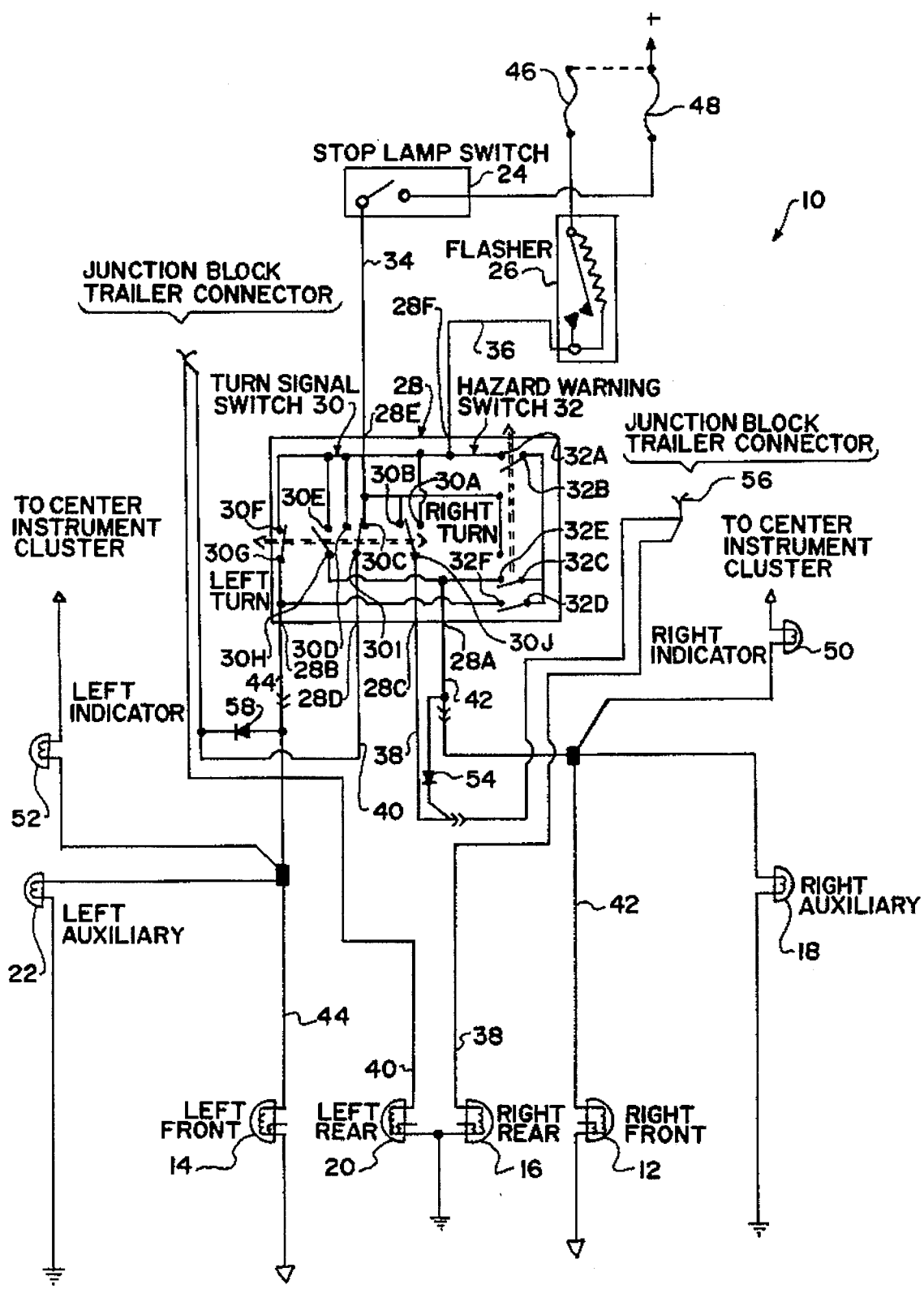
FIGURE 1 is an electrical schematic diagram of a vehicle lamp control circuit embodying principles of the invention.

FIGURE 1 shows a an automotive vehicle circuit 10 embodying principles of the invention and comprising: a right front lamp 12, a left front lamp 14, two right rear lamps 16 and 18, two left rear lamp 20 and 22, a stop lamp switch 24, a flasher 26, and a turn signal/hazard warning switch assembly 28.

Turn signal/hazard warning switch assembly 28 comprises a turn signal switch portion 30 that is selectively operable to off, right turn, and left turn positions, and a hazard warning switch portion 32 that is selectively operable to on and off positions. For connecting turn signal/hazard warning switch assembly 28 in circuit 10, the assembly has plural terminals 28A, 28B, 28C, 28D, 28E, and 28F for respective connection with right front lamp 12, left front lamp 14, right rear lamp 16, left rear lamp 20, stop lamp switch 24, and flasher 26 respectively.

A first circuit feed 34 extends between one terminal of stop lamp switch 24 and terminal 28E; a second circuit feed 36, between one terminal of flasher 26 and terminal 28F; a third circuit feed 38, between terminal 28C and one terminal of right rear lamp 16; a fourth circuit feed 40, between terminal 28D and one terminal of left rear lamp 20; a fifth circuit feed 42, between terminal 28A and one terminal of right front lamp 12; and a sixth circuit feed 44, between terminal 28B and one terminal of left front lamp 14. The electrical system of the illustrated embodiment is a negative-ground system, and hence the other terminals of lamps 12, 14, 16, 20 are connected to ground. The other terminals of stop lamp switch 24 and flasher 26 are connected through respective circuit protection devices 46, 48 to the positive terminal of the vehicle DC power source.

Lamps 18 and 22 are right and left auxiliary lamps that are disposed at the right rear and the left rear respectively of the vehicle. One terminal of each lamp 18 and 22 is connected to ground while the other terminal of lamp 18 is connected to feed 42 and the other terminal of lamp 22 is connected to feed 44. Right and left indicator lamps 50 and 52 respectively are disposed on the interior of the vehicle, for example in the instrument cluster, within the view of the driver. Each lamp 50, 52 is in effect respectively connected in parallel with the respective lamp pairs 12, 18, and 14, 22, respectively.

Turn signal switch portion 30 comprises internal terminals, or poles, schematically depicted as 30A, 30B, 30C, 30D, 30E, 30F, 30G, 30H, 30I, and 30J. Poles 30A, 30D, 30E, and 30F are commonly connected with terminal 28F; and poles 30B and 30C, with terminal 28E. Pole 30G and terminal 28B are commonly connected; pole 30H and terminal 28A are commonly connected; pole 30I and terminal 28D are commonly connected; and pole 30J and terminal 28C are commonly connected.

Hazard warning switch portion 32 comprises internal terminals, or poles, schematically depicted as 32A, 32B, 32C, 32D, 32E, and 32F. Pole 32A is commonly connected with terminal 28F; poles 32B, 32C, and 32D are commonly connected; pole 32E is commonly connected with terminal 28A; and pole 32F is commonly connected with terminal 28B.

While the internal terminals, or poles, of assembly 28 that are schematically depicted have been individually designated and identified, it is to be appreciated that the internal construction of a turn signal/hazard warning switch assembly may not necessarily have the same number of actual individual poles in each instance where plural poles are commonly connected, since the physical internal construction of a turn signal/hazard warning switch assembly may consolidate some or all of the commonly connected internal poles, as a single pole.

FIGURE 1 illustrates stop lamp switch 24 open, turn signal switch portion 30 off, and hazard warning switch portion 32 off. For this set of conditions, the turn signal portion switch mechanism establishes continuity between poles 30C and 30I and continuity between poles 30B and 30J, but pole 30I has no continuity with pole 30D, nor pole 30J, with pole 30A. Also, pole 30H has no continuity with pole 30E, and pole 30G has no continuity with pole 30F. For this same set of conditions, the hazard warning switch portion has no continuity from pole 30A to poles 32E and 32F. If stop lamp switch 24 is now actuated closed, circuits are completed through turn signal switch portion 30 from terminal 28E to terminals 28C and 28D causing rear lamps 16 and 20 to illuminate, indicating a stop signal.

If turn signal switch portion 30 is operated to its right turn position while stop lamp switch 24 remains actuated and hazard warning switch portion 32 remains in its off position, the turn signal switch portion's switch mechanism maintains continuity between terminals 28E and 28D so that left rear lamp 20 continues to give a stop signal by continuously illuminating so long as stop lamp switch 24 remains actuated, but breaks continuity between terminals 28E and 28C and establishes continuity between terminal 28F and terminal 28C causing flasher 26 to flash right rear lamp 16 on and off to signal an intended right turn. In the right turn position, turn signal switch portion 30 also establishes continuity between terminals 28F and 28A causing flasher 26 to also flash the other right lamps 12, 18, and 50.

If turn signal switch portion 30 is operated to its left turn position while stop lamp switch 24 remains actuated and hazard warning switch portion 32 remains in its off position, the turn signal switch portion's switch mechanism maintains continuity between terminals 28E and 28C so that right rear lamp 16 continues to give a stop signal by continuously illuminating so long as stop lamp switch 24 remains actuated, but breaks continuity between terminals 28E and 28D and establishes continuity between terminal 28F and terminal 28D causing flasher 26 to flash left rear lamp 20 on and off to signal an intended left turn. In the left turn position, turn signal switch portion 30 also establishes continuity between terminals 28F and 28B causing flasher 26 to also flash the other left lamps 14, 22, and 52.

When hazard warning switch portion 32 is placed in its on position, its switch mechanism makes continuity between terminal 28F and terminals 28A and 28B, and when in the off position, breaks such continuity. It may be noted that hazard warning switch portion 32 lacks any association with terminals 28C, 28D, and 28E.

A first unidirectional current path is provided between feeds 42 and 38, and it i) allows current flowing through turn signal switch portion 30 to flow through feeds 42 and 38 to right front lamp 12 and right rear lamp 16 respectively when turn signal switch portion 30 is operated to its right turn position, ii) allows current flowing through hazard warning switch portion 32 to branch and operate both lamps 12 and 16 when hazard warning switch portion 32 is in its on position and stop lamp switch 24 is not actuated, but iii) when the stop lamp switch is actuated, constrains current flow through feed 38 to that feed to cause right rear lamp 16 to give a stop signal, and does not allow current from feed 38 to branch in right front lamp 12 if hazard warning switch portion 32 is concurrently on.

This first unidirectional current path comprises a diode 54 having an anode terminal and a cathode terminal. The anode terminal is connected to feed 42, and the cathode terminal, to feed 38. Because of this poling, current is prevented from flowing from feed 38 to feed 42 irrespective of the position of hazard warning switch portion 32.

When the inventive circuit is fabricated by adapting a pre-existing circuit, the diode can be advantageously connected to the wiring harness so that it is external to assembly 28. While a single diode is shown, it is to be appreciated that multiple parallel diodes, or any equivalent device(s) can be employed, depending on current load requirements. A terminal 56 of a junction block trailer connector is connected to feed 38 for availability when the vehicle tows a trailer so that a right rear lamp of such a trailer can operate in the same manner as right rear lamp 16 when connected to such terminal. Although not shown in the drawing, another junction block trailer connector terminal could be connected to feed 42 so that a right rear auxiliary lamp on such a trailer can be connected to such a terminal to operate in the same manner as auxiliary lamp 18.

A second unidirectional current path is provided between feeds 44 and 40, and it i) allows current flowing through turn signal switch portion 30 to flow through feeds 44 and 40 to left front lamp 14 and left rear lamp 20 respectively when turn signal switch portion 30 is operated to its left turn position, ii) allows current flowing through hazard warning switch portion 32 to branch and operate both lamps 14 and 20 when hazard warning switch portion 32 is in its on position and stop lamp switch 24 is not actuated, but iii) when the stop lamp switch is actuated, constrains current flow through feed 40 to that feed to cause left rear lamp 20 to give a stop signal, and does not allow current from feed 40 to branch in left front lamp 14 if hazard warning switch portion 32 is concurrently on.

This second unidirectional current path comprises a diode 58 having an anode terminal and a cathode terminal. The anode terminal is connected to feed 44, and the cathode terminal, to feed 40. Because of this poling, current is prevented from flowing from feed 40 to feed 44 irrespective of the position of hazard warning switch portion 32.

When the inventive circuit is fabricated by adapting a pre-existing circuit, diode 58 can be advantageously connected to the wiring harness so that it is external to assembly 28. While a single diode is shown, it is to be appreciated that multiple parallel diodes, or any equivalent device(s) can be employed, depending on current load requirements. A terminal 60 of the junction block trailer connector is connected to feed 40 for availability when the vehicle tows a trailer so that a left rear lamp of such a trailer can operate in the same manner as left rear lamp 20 when connected to such terminal. Although not shown in the drawing, another junction block trailer connector terminal could be connected to feed 44 so that a left rear auxiliary lamp on such a trailer can be connected to such a terminal to operate in the same manner as auxiliary lamp 22.

While a presently preferred embodiment of the invention has been illustrated and described, it is to be appreciated that the principles may be practiced in other equivalent ways within the scope of the following claims.

What is claimed is:

1. An automotive vehicle electrical circuit comprising:

right front lamp means, left front lamp means, right rear lamp means, left rear lamp means, a stop lamp switch, a flasher, and a turn signal/hazard warning switch assembly; said turn signal/hazard warning switch assembly having plural terminals each for respective connection with a respective one of said right front lamp means, said left front lamp means, said right rear lamp means, said left rear lamp means, said stop lamp switch, and said flasher;

a first circuit feed between said stop lamp switch and a first of said plural terminals;

a second circuit feed between said flasher and a second of said plural terminals;

a third circuit feed between a third of said plural terminals and said right rear lamp means;

a fourth circuit feed between a fourth of said plural terminals and said left rear lamp means;

a fifth circuit feed between a fifth of said plural terminals and said right front lamp means;

a sixth circuit feed between a sixth of said plural terminals and said left front lamp means;

said turn signal/hazard warning switch assembly comprising a turn signal switch portion that is selectively operable to off, right turn, and left turn positions, and a hazard warning switch portion that is selectively operable to on and off positions;

said turn signal switch portion, when in its off position and when said hazard warning switch portion is also in its off position, making continuity between said first terminal and said third and fourth terminals, to cause said right rear lamp means and said left rear lamp means to give a stop signal whenever said stop lamp switch is actuated;

said turn signal switch portion, when in its right turn position and when said hazard warning switch portion is in its off position, maintaining continuity between said first terminal and said fourth terminal, but breaking continuity between said first terminal and said third terminal and making continuity between said second terminal and said third and fifth terminals to cause said flasher to flash said right rear lamp means and said right front lamp means for giving a right turn signal, while enabling said left rear lamp means to give a stop signal whenever said stop lamp switch is actuated;

said turn signal switch portion, when in its left turn position and when said hazard warning switch portion is in its off position, maintaining continuity between said first terminal and said third terminal, but breaking continuity between said first terminal and said fourth terminal and making continuity between said second terminal and said fourth and sixth terminals to cause said flasher to flash said left rear lamp means and said left front lamp means for giving a left turn signal, while enabling said right rear lamp means to give a stop signal whenever said stop lamp switch is actuated;

said hazard warning switch portion, when in its on position, making continuity between said second terminal and said fifth and sixth terminals, and when in its off position, breaking continuity between said second terminal and said fifth and sixth terminals, said hazard warning switch portion lacking any association with said first, third, and fourth terminals;

a first unidirectional current path between said third and fifth current feeds that i) allows current flowing through said turn signal switch portion to flow both in said right front lamp means and in said right rear lamp means when said turn signal switch portion is operated to its right turn position so that said flasher flashes said right front lamp means and said right rear lamp means for giving a right turn signal, ii) allows current flowing through said hazard warning switch portion to branch in said right front lamp means and said right rear lamp means when said hazard warning switch portion is in its on position and said stop lamp switch is not actuated so that said flasher flashes both said right front lamp means and said right rear lamp means for giving a hazard warning signal, but iii) when said stop lamp switch is actuated while said hazard warning switch portion remains in its on position, constrains current to flow in said right rear lamp means without branching in said right front lamp means so that said right rear lamp means gives a stop signal and said flasher continues to flash said right front lamp means for continuing to give a hazard warning signal; and a second unidirectional current path between said fourth and sixth current feeds that i) allows current flowing through said turn signal switch portion to flow both in said left front lamp means and in said left rear lamp means when said turn signal switch portion is operated to its left turn position so that said flasher flashes both said left front lamp means and said left rear lamp means for giving a left turn signal, ii) allows current flowing through said hazard warning switch portion to branch in said left front lamp means and said left rear lamp means when said hazard warning switch portion is in its on position and said stop lamp switch is not actuated so that said flasher flashes both said left front lamp means and said left rear lamp means for giving a hazard warning signal, but iii) when said stop lamp switch is actuated while said hazard warning switch portion remains in its on position, constrains current to flow in said left rear lamp means without branching in said left front lamp means so that said left rear lamp means gives a stop signal and said flasher continues to flash said left front lamp means for continuing to give a hazard warning signal.

2. An automotive vehicle electrical circuit as set forth in claim 1 wherein said first unidirectional current path comprises a first diode and said second unidirectional current path comprises a second diode.

3. An automotive vehicle electrical circuit as set forth in claim 2 wherein said first diode comprises an anode terminal and a cathode terminal, said first diode's anode terminal is connected to said fifth current feed, said first diode's cathode terminal is connected to said third current feed, said second diode comprises an anode terminal and a cathode terminal, said second diode's anode terminal is connected to said sixth current feed, and said second diode's cathode terminal is connected to said fourth current feed.

4. An automotive vehicle electrical circuit as set forth in claim 3 wherein both said first diode and said second diode are disposed external to said turn signal/hazard warning switch assembly.

5. An automotive vehicle electrical circuit as set forth in claim 1 further including right rear auxiliary lamps means connected in parallel circuit relation with said right front lamp means, and left rear auxiliary lamp means connected in parallel circuit relation with said left front lamp means.

6. An automotive vehicle electrical circuit comprising:

right front lamp means, left front lamp means, right rear lamp means, left rear lamp means, a stop lamp switch, a flasher, and a turn signal/hazard warning switch assembly; said turn signal/hazard warning switch assembly having plural terminals each for respective connection with a respective one of said right front lamp means, said left front lamp means, said right rear lamp means, said left rear lamp means, said stop lamp switch, and said flasher;

a first circuit feed between said stop lamp switch and a first of said plural terminals;

a second circuit feed between said flasher and a second of said plural terminals;

a third circuit feed between a third of said plural terminals and said right rear lamp means;

a fourth circuit feed between a fourth of said plural terminals and said left rear lamp means;

a fifth circuit feed between a fifth of said plural terminals and said right front lamp means; and a sixth circuit feed between a sixth of said plural terminals and said left front lamp means;

said turn signal/hazard warning switch assembly comprising a turn signal switch portion that is selectively operable to off, right turn, and left turn positions, and a hazard warning switch portion that is selectively operable to on and off positions;

said turn signal switch portion, when in its off position and when said hazard warning switch portion is also in its off position, making continuity between said first terminal and said third and fourth terminals, to cause said right rear lamp means and said left rear lamp means to give a stop signal whenever said stop lamp switch is actuated;

said turn signal switch portion, when in its right turn position and when said hazard warning switch portion is in its off position, maintaining continuity between said first terminal and said fourth terminal, but breaking continuity between said first terminal and said third terminal and making continuity between said second terminal and said third and fifth terminals to cause said flasher to flash said right rear lamp means and said right front lamp means for giving a right turn signal, while enabling said left rear lamp means to give a stop signal whenever said stop lamp switch is actuated;

said turn signal switch portion, when in its left turn position and when said hazard warning switch portion is in its off position, maintaining continuity between said first terminal and said third terminal, but breaking continuity between said first terminal and said fourth terminal and making continuity between said second terminal and said fourth and sixth terminals to cause said flasher to flash said left rear lamp means and said left front lamp means for giving a left turn signal, while enabling said right rear lamp means to give a stop signal whenever said stop lamp switch is actuated;

said hazard warning switch portion, when in its on position, making continuity between said second terminal and said fifth and sixth terminals, and when in its off position, breaking continuity between said second terminal and said fifth and sixth terminals;

a first diode in circuit relation with said third and fifth terminals to i) allow current flowing through said turn signal switch portion to flow both in said right front lamp means and in said right rear lamp means when said turn signal switch portion is operated to its right turn position so that said flasher flashes said right front lamp means and said right rear lamp means for giving a right turn signal, ii) allow current flowing through said hazard warning switch portion to branch in said right front lamp means and said right rear lamp means when said hazard warning switch portion is in its on position and said stop lamp switch is not actuated so that said flasher flashes both said right front lamp means and said right rear lamp means for giving a hazard warning signal, but iii) when said stop lamp switch is actuated while said hazard warning switch portion remains in its on position, prevents current branching in said right front lamp means by constraining current to flow in said right rear lamp means so that said right rear lamp means continues to give a stop signal and said flasher continues to flash said right front lamp means for continuing to give a hazard warning signal; and a second diode in circuit relation with said fourth and sixth terminals to i) allow current flowing through said turn signal switch portion to flow both in said left front lamp means and in said left rear lamp means when said turn signal switch portion is operated to its left turn position so that said flasher flashes said left front lamp means and said left rear lamp means for giving a left turn signal, ii) allow current flowing through said hazard warning switch portion to branch in said left front lamp means and said left rear lamp means when said hazard warning switch portion is in its on position and said stop lamp switch is not actuated so that said flasher flashes both said left front lamp means and said left rear lamp means for giving a hazard warning signal, but iii) when said stop lamp switch is actuated while said hazard warning switch portion remains in its on position, prevents current branching in said left front lamp means by constraining current to flow in said left rear lamp means so that said left rear lamp means continues to give a stop signal and said flasher continues to flash said left front lamp means for continuing to give a hazard warning signal.

7. An automotive vehicle electrical circuit as set forth in claim 6 wherein said first diode comprises an anode terminal and a cathode terminal, said first diode's anode terminal and said fifth terminal are connected in common, said first diode's cathode terminal and said third terminal are connected in common, said second diode comprises an anode terminal and a cathode terminal, said second diode's anode terminal and said sixth terminal are connected in common, and said second diode's cathode terminal and said fourth terminal are connected in common.

8. An automotive vehicle electrical circuit as set forth in claim 7 wherein said anode and cathode terminals of said first diode are connected physically to said fifth current feed and said third current feed respectively, and said anode and cathode terminals of said second diode are connected physically to said sixth current feed and said fourth current feed respectively.

9. An automotive vehicle electrical circuit as set forth in claim 6 further including right rear auxiliary lamps means connected in parallel circuit relation with said right front lamp means, and left rear auxiliary lamp means connected in parallel circuit relation with said left front lamp means.

10. An automotive vehicle electrical circuit comprising:

right front lamp means, left front lamp means, right rear lamp means, left rear lamp means, a stop lamp switch, a flasher, a turn signal switch that is selectively operable to off, right turn, and left turn positions, and a hazard warning switch that is selectively operable to on and off positions;

said turn signal switch and said hazard warning switch each comprising plural poles;

a first circuit feed between said stop lamp switch and a first pole of said turn signal switch;

means connecting a second pole of said turn signal switch and a first pole of said hazard warning switch in common;

a second circuit feed between said flasher and said commonly connected second pole of said turn signal switch and first pole of said hazard warning switch;

a third circuit feed between a third pole of said turn signal switch and said right rear lamp means;

a fourth circuit feed between a fourth pole of said turn signal switch and said left rear lamp means;

means connecting a fifth pole of said turn signal switch and a second pole of said hazard warning switch in common;

a fifth circuit feed between said commonly connected fifth pole of said turn signal switch and second pole of said hazard warning switch and said right front lamp means;

means connecting a sixth pole of said turn signal switch and a third pole of said hazard warning switch in common;

a sixth circuit feed between said commonly connected sixth pole of said turn signal switch and third pole of said hazard warning switch and said left front lamp means;

said turn signal switch, when in its off position and when said hazard warning switch is also in its off position, making continuity between said first pole of said turn signal switch and said third and fourth poles of said turn signal switch, to cause said right rear lamp means and said left rear lamp means to give a stop signal whenever said stop lamp switch is actuated;

said turn signal switch, when in its right turn position and when said hazard warning switch is in its off position, maintaining continuity between said first pole of said turn signal switch and said fourth pole of said turn signal switch, but breaking continuity between said first pole of said turn signal switch and said third pole of said turn signal switch and making continuity between said second pole of said turn signal switch and said third and fifth poles of said turn signal switch to cause said flasher to flash said right rear lamp means and right front lamp means for giving a right turn signal, while enabling said left rear lamp means to give a stop signal whenever said stop lamp switch is actuated;

said turn signal switch, when in its left turn position and when said hazard warning switch is in its off position, maintaining continuity between said first pole of said turn signal switch and said third pole of said turn signal switch, but breaking continuity between said first pole of said turn signal switch and said fourth pole of said turn signal switch and making continuity between said second pole of said turn signal switch and said fourth and sixth poles of said turn signal switch to cause said flasher to flash said left rear lamp means and said left front lamp means for giving a left turn signal, while enabling said right rear lamp means to give a stop signal whenever said stop lamp switch is actuated;

said hazard warning switch, when in its on position, making continuity between its first pole and its second and third poles, and when in its off position, breaking continuity between its first pole and its second and third poles;

a first unidirectional current path between said third and fifth current feeds that i) allows current flowing through said turn signal switch to flow both in both said right front lamp means and in said right rear lamp means when said turn signal switch is operated to its right turn position so that said flasher flashes said right front lamp means and said right rear lamp means for giving a right turn signal, ii) allows current flowing through said hazard warning switch to branch in said right front lamp means and said right rear lamp means when said hazard warning switch is in its on position and said stop lamp switch is not actuated so that said flasher flashes both said right front lamp means and said right rear lamp means for giving a hazard warning signal, but iii) when said stop lamp switch is actuated while said hazard warning switch remains in its on position, constrains current to flow in said right rear lamp means without branching in said right front lamp means so that said right rear lamp means gives a stop signal and said flasher continues to flash said right front lamp means for continuing to give a hazard warning signal; and a second unidirectional current path between said fourth and sixth current feeds that i) allows current flowing through said turn signal switch to flow both in both said left front lamp means and in said left rear lamp means when said turn signal switch is operated to its left turn position so that said flasher flashes said left front lamp means and said left rear lamp means for giving a left turn signal, ii) allows current flowing through said hazard warning switch to branch in said left front lamp means and said left rear lamp means when said hazard warning switch is in its on position and said stop lamp switch is not actuated so that said flasher flashes both said left front lamp means and said left rear lamp means for giving a hazard warning signal, but iii) when said stop lamp switch is actuated while said hazard warning switch remains in its on position, constrains current to flow in said left rear lamp means without branching in said left front lamp means so that said left rear lamp means gives a stop signal and said flasher continues to flash said left front lamp means for continuing to give a hazard warning signal.

11. An automotive vehicle electrical circuit as set forth in claim 10 wherein said first unidirectional current path comprises a first diode and said second unidirectional current path comprises a second diode.

12. An automotive vehicle electrical circuit as set forth in claim 11 wherein said first diode comprises an anode terminal and a cathode terminal, said first diode's anode terminal is connected to said fifth current feed, said first diode's cathode terminal is connected to said third current feed, said second diode comprises an anode terminal and a cathode terminal, said second diode's anode terminal is connected to said sixth current feed, and said second diode's cathode terminal is connected to said fourth current feed.

13. An automotive vehicle electrical circuit as set forth in claim 12 wherein both said first diode and said second diode are disposed external to both said turn signal switch and said hazard warning switch.

14. An automotive vehicle electrical circuit as set forth in claim 10 further including right rear auxiliary lamps means connected in parallel circuit relation with said right front lamp means, and left rear auxiliary lamp means connected in parallel circuit relation with said left front lamp means.

15. An automotive vehicle electrical circuit comprising:

right front lamp means, left front lamp means, right rear lamp means, left rear lamp means, a stop lamp switch, a flasher, a turn signal switch that is selectively operable to off, right turn, and left turn positions, and a hazard warning switch that is selectively operable to on and off positions;

said turn signal switch and said hazard warning switch each comprising plural poles;

a first circuit feed between said stop lamp switch and a first pole of said turn signal switch;

means connecting a second pole of said turn signal switch and a first pole of said hazard warning switch in common;

a second circuit feed between said flasher and said commonly connected second pole of said turn signal switch and first pole of said hazard warning switch;

a third circuit feed between a third pole of said turn signal switch and said right rear lamp means;

a fourth circuit feed between a fourth pole of said turn signal switch and said left rear lamp means;

means connecting a fifth pole of said turn signal switch and a second pole of said hazard warning switch in common;

a fifth circuit feed between said commonly connected fifth pole of said turn signal switch and second pole of said hazard warning switch and said right front lamp means;

means connecting a sixth pole of said turn signal switch and a third pole of said hazard warning switch in common;

a sixth circuit feed between said commonly connected sixth pole of said turn signal switch and third pole of said hazard warning switch and said left front lamp means;

said turn signal switch, when in its off position and when said hazard warning switch is also in its off position, making continuity between said first pole of said turn signal switch and said third and fourth poles of said turn signal switch, to cause said right rear lamp means and said left rear lamp means to give a stop signal whenever said stop lamp switch is actuated;

said turn signal switch, when in its right turn position and when said hazard warning switch is in its off position, maintaining continuity between said first pole of said turn signal switch and said fourth pole of said turn signal switch, but breaking continuity between said first pole of said turn signal switch and said third pole of said turn signal switch and making continuity between said second pole of said turn signal switch and said third and fifth poles of said turn signal switch to cause said flasher to flash said right rear lamp means and said right front lamp means for giving a right turn signal, while enabling said left rear lamp means to give a stop signal whenever said stop lamp switch is actuated;

said turn signal switch, when in its left turn position and when said hazard warning switch is in its off position, maintaining continuity between said first pole of said turn signal switch and said third pole of said turn signal switch, but breaking continuity between said first pole of said turn signal switch and said fourth pole of said turn signal switch and making continuity between said second pole of said turn signal switch and said fourth and sixth poles of said turn signal switch to cause said flasher to flash said left rear lamp means and said left front lamp means for giving a left turn signal, while enabling said right rear lamp means to give a stop signal whenever said stop lamp switch is actuated;

said hazard warning switch, when in its on position, making continuity between its first pole and its second and third poles, and when in its off position, breaking continuity between its first pole and its second and third poles;

a first diode in circuit relation with said third pole of said turn signal switch and said commonly connected fifth pole of said turn signal switch and second pole of said hazard warning switch to i) allow current flowing through said turn signal switch to flow both in said right front lamp means and in said right rear lamp means when said turn signal switch is operated to its right turn position so that said flasher flashes said right front lamp means and said right rear lamp means for giving a right turn signal, ii) allow current flowing through said hazard warning switch to branch in said right front lamp means and said right rear lamp means when said hazard warning switch is in its on position and said stop lamp switch is not actuated so that said flasher flashes both said right front lamp means and said right rear lamp means for giving a hazard warning signal, but iii) when said stop lamp switch is actuated while said hazard warning lamp switch remains in its on position, constrains current to flow in said right rear lamp means without branching in said right front lamp means so that said right rear lamp means continues to give a stop signal and said flasher continues to flash said right front lamp means for continuing to give a hazard warning signal; and a second diode in circuit relation with said fourth pole of said turn signal switch and said commonly connected sixth pole of said turn signal switch and third pole of said hazard warning switch to i) allow current flowing through said turn signal switch to flow both in said left front lamp means and in said left rear lamp means when said turn signal switch is operated to its left turn position so that said flasher flashes said left front lamp means and said left rear lamp means for giving a left turn signal, ii) allow current flowing through said hazard warning switch to branch in said left front lamp means and said left rear lamp means when said hazard warning switch is in its on position and said stop lamp switch is not actuated so that said flasher flashes both said left front lamp means and said left rear lamp means for giving a hazard warning signal, but iii) when said stop lamp switch is actuated while said hazard warning switch remains in its on position, constrains current to flow in said left rear lamp means without branching in said left front lamp means so that said left rear lamp means continues to give a stop signal and said flasher continues to flash said left front lamp means for continuing to give a hazard warning signal.

16. An automotive vehicle electrical circuit as set forth in claim 15 wherein said first unidirectional current path comprises a first diode and said second unidirectional current path comprises a second diode.

17. An automotive vehicle electrical circuit as set forth in claim 16 wherein said first diode comprises an anode terminal and a cathode terminal, said first diode's anode terminal is connected to said fifth current feed, said first diode's cathode terminal is connected to said third current feed, said second diode comprises an anode terminal and a cathode terminal, said second diode's anode terminal is connected to said sixth current feed, and said second diode's cathode terminal is connected to said fourth current feed.

18. An automotive vehicle electrical circuit as set forth in claim 15 further including right rear auxiliary lamps means connected in parallel circuit relation with said right front lamp means, and left rear auxiliary lamp means connected in parallel circuit relation with said left front lamp means.

* * * * *